United States Patent [19]

Reynolds

[11] Patent Number: 5,542,776
[45] Date of Patent: Aug. 6, 1996

[54] HOSE-TO WIRELINE CONNECTOR

[76] Inventor: Graeme E. Reynolds, 2053 Western Village, Houston, Tex. 77043

[21] Appl. No.: 259,956

[22] Filed: Jun. 14, 1994

[51] Int. Cl.$^6$ .................................................. F16B 7/04
[52] U.S. Cl. ..................... 403/389; 403/385; 403/391; 24/115 L
[58] Field of Search ...................... 403/385, 387, 403/386, 389, 391, 398, 399, 384, DIG. 9, 59; 24/115 L, 136 A, 135 R; 166/342, 343, 349; 384/54, 58

[56] References Cited

U.S. PATENT DOCUMENTS

| | | | |
|---|---|---|---|
| 1,834,838 | 12/1931 | Hingley . | |
| 2,107,407 | 2/1938 | Burton | 189/36 |
| 2,898,090 | 8/1959 | Rasmussen | 256/13.1 |
| 4,059,872 | 11/1977 | Delesandri | 24/284 |
| 4,228,857 | 10/1980 | Nobileau | 166/341 |
| 4,437,791 | 3/1984 | Reynolds | 405/195 |
| 4,512,409 | 4/1985 | Gregory et al. | 166/349 X |
| 4,566,819 | 1/1986 | Johnston | 403/385 |
| 4,632,221 | 12/1986 | Stanford | 403/385 X |
| 5,156,463 | 10/1992 | Zaguroli, Jr. | 384/58 X |
| 5,257,871 | 11/1993 | Zona et al. | 403/59 X |

FOREIGN PATENT DOCUMENTS

| | | |
|---|---|---|
| 62528/65 | 2/1967 | Australia . |
| 2097055 | 10/1936 | United Kingdom . |
| 171126 | 11/1969 | United Kingdom . |
| 1425921 | 2/1976 | United Kingdom . |
| 1535209 | 12/1978 | United Kingdom . |
| 1537257 | 12/1978 | United Kingdom . |
| 2036849 | 7/1980 | United Kingdom . |
| 1276068 | 6/1992 | United Kingdom . |

OTHER PUBLICATIONS

Composite Catalog of Oil Field Equipment and Services for years 1976–1977, published by World Oil, pp. 1370 and 5345.

*Primary Examiner*—Brian K. Green
*Assistant Examiner*—Harry C. Kim
*Attorney, Agent, or Firm*—Pravel, Hewitt, Kimball & Krieger

[57] ABSTRACT

A connector device freely secures a hydraulic hose to a wireline and comprises a generally cylindrical clamping body having an axial passage therethrough. The clamping body is formed having first and second semi-cylindrical body members which are permitted to pivotally move between an open and a closed position. A clamping assembly secures the first and second body members in the closed position. A closure assembly releasably and freely attaches the cylindrical clamping body to the wireline. The closure assembly includes a plurality of rotatably-mounted rollers surrounding the enclosed wireline W and provides substantially frictionless relative movement of the connector device along the wireline.

8 Claims, 2 Drawing Sheets

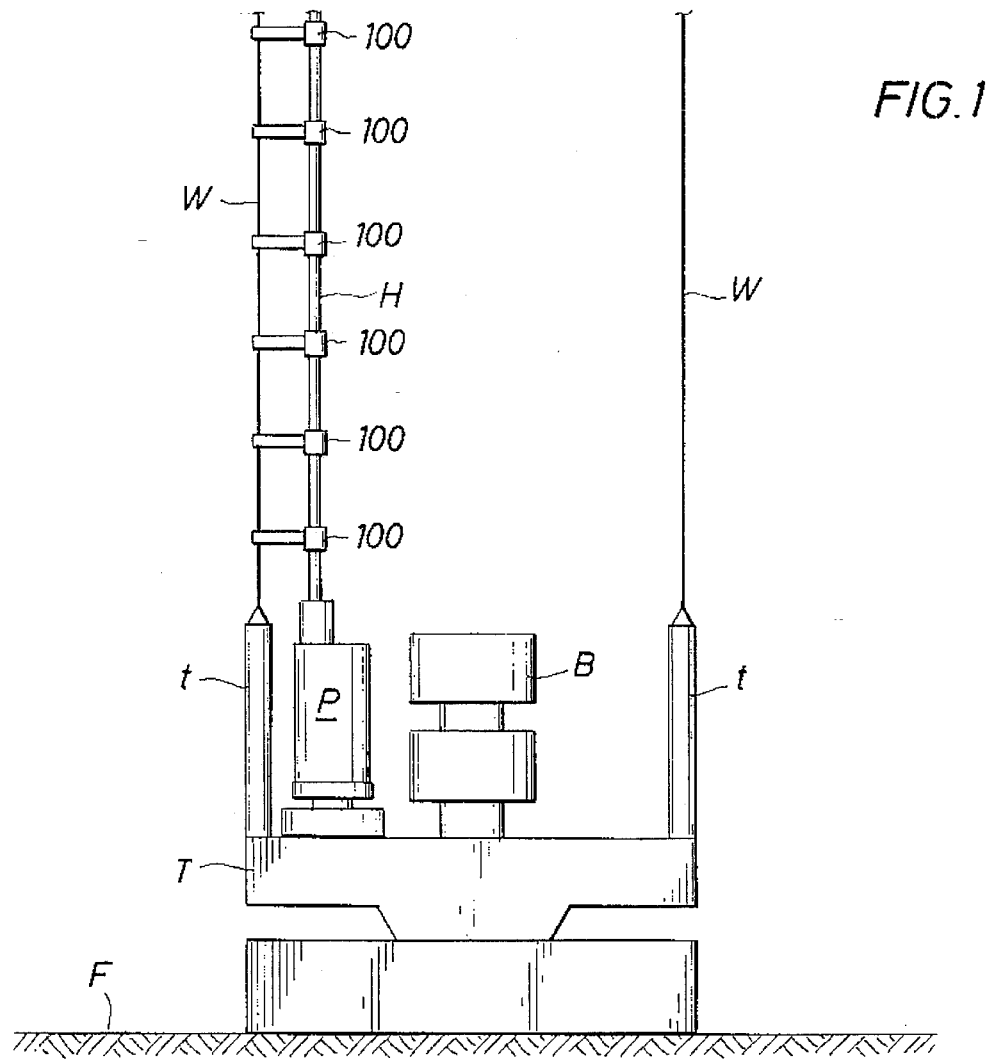
FIG. 1
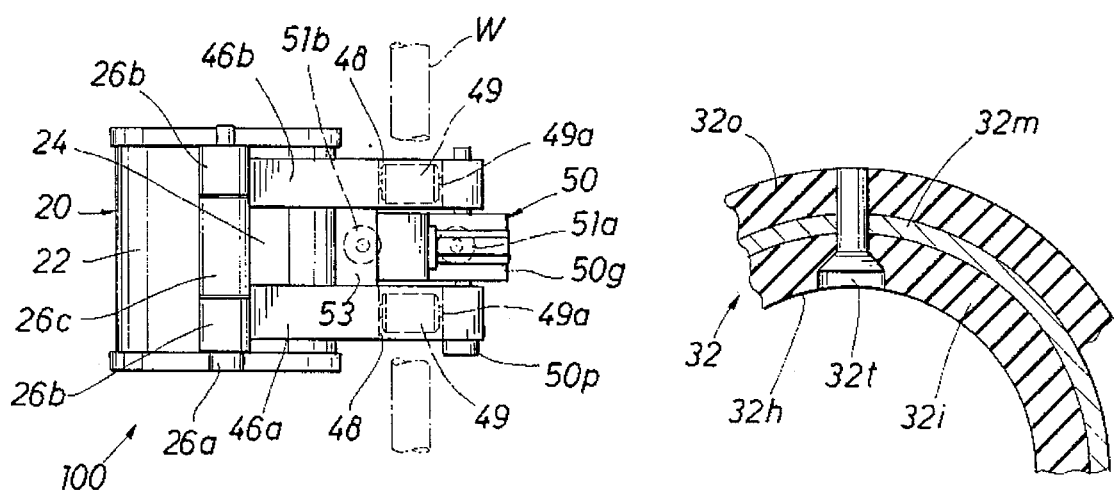
FIG. 5
FIG. 6

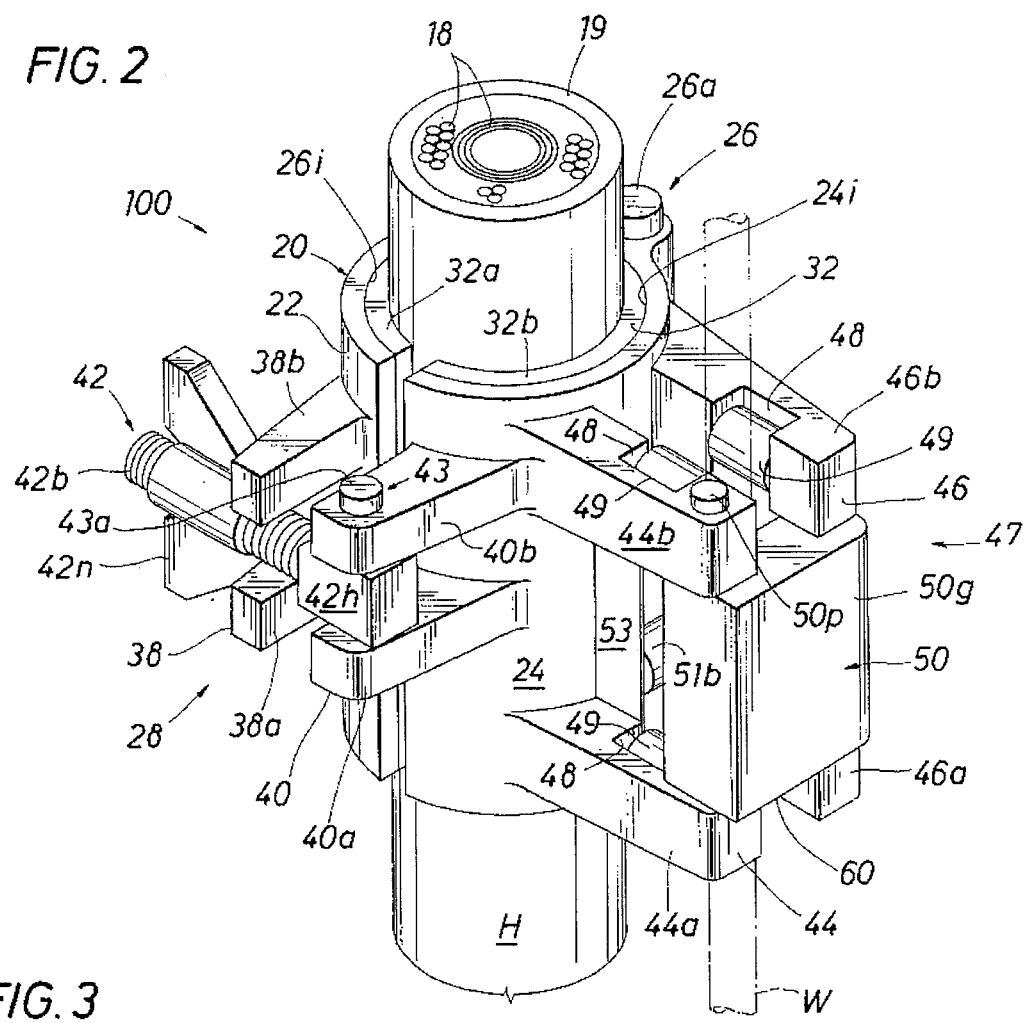
FIG. 2
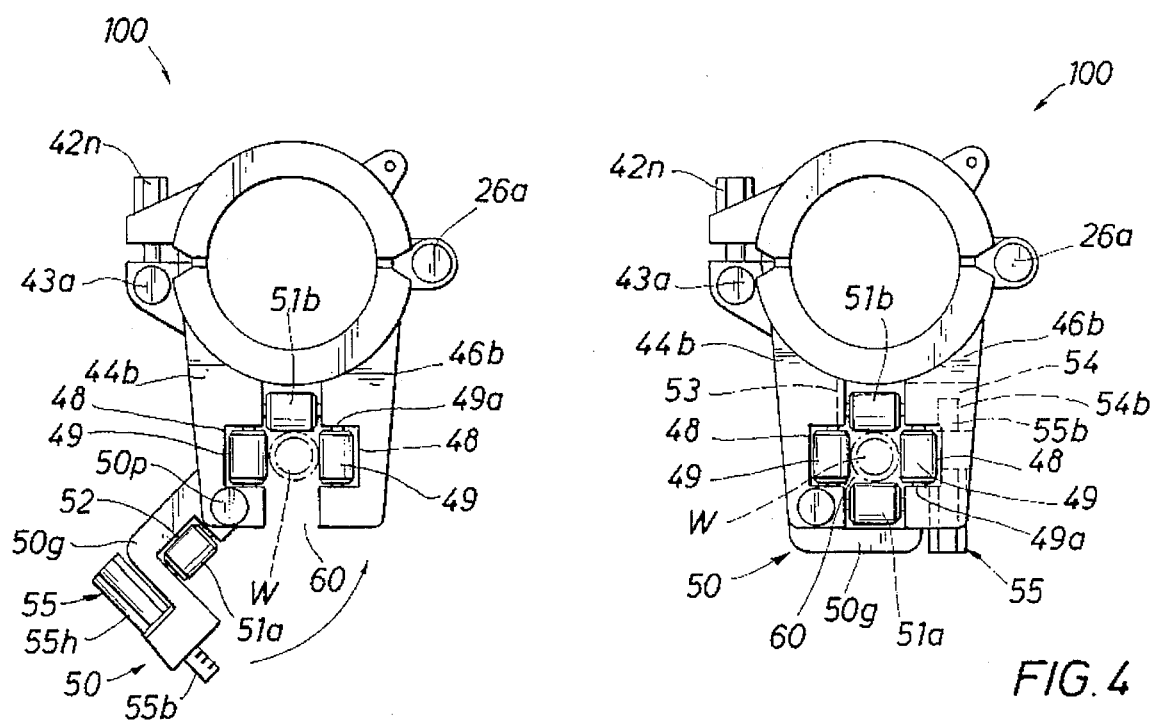
FIG. 3
FIG. 4

HOSE-TO-WIRELINE CONNECTOR

BACKGROUND OF THE INVENTION

1. Field of the Invention

This invention relates to the field of connector devices for freely securing a hydraulic hose bundle to a wireline.

2. Description of the Prior Art

A hydraulic hose or tube bundle used in oil well drilling and production is typically made of a plurality of individual or single-line hydraulic hoses bundled together in a compact design and having a plastic outer sheath. The diameter of the hydraulic hose bundle varies with respect to the desired number and size of hoses utilized. Typically, in an offshore drilling operation such a hose bundle is used to transmit hydraulic fluid under pressure from control equipment located on an offshore oil well platform or a floating vessel to a control pod for a subsea blowout preventer stack. The hydraulic hose or tube bundle is flexible and generally extends for several hundred feet or more depending on the water depth. Because the tube bundle is flexible and must extend several hundred feet or more from a surface vessel or platform to a control pod or a blowout preventer stack, it is necessary to attach the tube bundle to some type of support structure, as for example a guide cable or wireline.

It is known to fixedly attach the tube bundle to the extended cable or wireline via a series of clamps spaced along the extended cable or wireline. A type of control hose clamp known includes two clamping sections-pivotally connected by an exterior hinge and having an over center or off-center latch securing the control bundle and wireline between the two sections. Such control bundle clamps are manufactured in various sizes to conform to the various sizes of tube bundles utilized.

As offshore platforms and floating drilling rigs have ventured into deeper waters, the environment has become more of a problem to operating sub-surface through control hose bundles. The currents may be worse because of depth or even because of the area and the temperature of the water may even be a negative factor to the life of the control hose bundle. The light polyurethane that is utilized as the outer coating on tube bundles has a tendency to get torn up. The tube bundles are extremely expensive, and since it may be necessary to shut down a drilling rig or workover operation if a control hose bundle is damaged to the extent that the control pod may not be operable, maintaining the integrity of the tube bundles is a very important consideration.

U.S. Pat. No. 4,437,791 discloses a clamp for hydraulic hose bundles having a pivoting clamping body with an inner deformable sleeve which is clamped to the tube bundle. The deformable sleeve protects the tube bundle from degrading and chafing around the clamped portion as marine forces cause flexing of the intermediate sections of the tube bundles.

In certain offshore oil drilling/production situations, it is desirable to lower a control pod or other piece of subsea equipment to the sea floor from the water surface or retrieve the same to the water surface with the aid of a guide wire or wireline firmly attached to a subsea template or other stationary equipment positioned at the sea floor. In such situations, it is necessary to leave the guide wire in place as the control pod and tube bundle are lowered into position or retrieved. Additionally, it is necessary to provide lateral support for the tube bundle running from the surface down to the sea floor while performing subsea operations.

In the type of hose bundle clamps known, the clamps firmly grip the tube bundle and firmly grip or deform the wireline or member to which they are attached. It is desirable to have a connector device which firmly grips the tube bundle and freely attaches to a wireline or guide wire to allow the connector device to freely travel along the length of the wireline. It is further desirable that the connector device can be quickly and easily removed from the wireline.

SUMMARY OF THE INVENTION

The present invention relates to a new and improved connector device to freely secure a hydraulic hose or tube bundle to a guide cable or a wireline. The present invention makes it possible to use a standardized clamping body with a deformable sleeve to secure hydraulic hose bundles of varying sizes. The connector device comprises a generally cylindrical clamping body having an axial passage through the clamping body. The clamping body is formed having first and second semi-cylindrical body members, with each body member having interior wall portions. A pivotal mount means operably connects the first and second body members for pivotal movement between an open and a closed position. A clamping means firmly secures the first and second body members in the closed position and a closure means, mounted with one of the first and second body members, removably and freely attaches the cylindrical clamping body to the wireline such that the connector device is permitted to freely travel along the length of the wireline, or alternatively the wireline is permitted to free-run relative to the connector device.

BRIEF DESCRIPTION OF THE DRAWINGS

In order to more fully understand the drawings referred to in the detailed description of the present invention, a brief description of each drawing is presented, in which:

FIG. 1 is a schematic diagram of a marine hydraulic control system with the connector devices of the present invention freely mounted to a wireline;

FIG. 2 is a perspective view of the connector device of the present invention providing clamping engagement with a hose bundle and freely attaching to a wireline;

FIG. 3 is a top view of the connector device with the closure means in an open position;

FIG. 4 is a top view of the connector device with the closure means in a closed position;

FIG. 5 is a side elevational view of the connector device with the closure means in a closed position; and FIG. 6 is a partial cross-sectional view of the deformable sleeve.

DESCRIPTION OF THE PREFERRED EMBODIMENT

Referring now to FIG. 1, a subsea wellhead template T with a blowout preventer stack (BOP) B is depicted at the ocean floor F. It is to be understood that the depiction in FIG. 1 is merely for illustrative purposes to explain one type of use for the hose-to-wireline connector 100 of the present invention. The template T includes a plurality of upright members t to which guide cables or wirelines W are attached. Hydraulic power and control hoses in a tube bundle H extends between tube bundle reels on the floating vessel at the water surface (not shown) and the hydraulic control pods P connected to the BOP stack B. The wirelines W extend between wireline reels (not shown) mounted on the floating vessel and the subsea template T, each wireline W providing guidance and support to the tube bundle H through a series of the connector devices 100.

Referring to FIG. 2, the hydraulic hose bundle H is composed of a plurality of individual hydraulic single-line hoses 18 of various sizes combined in a compact design and encased with a plastic outer sheath 19. Referring to FIG. 1, a hydraulic power unit with a hydraulic control panel on the floating vessel (not shown) transmits hydraulic fluid through the individual hoses 18 of the hydraulic hose bundle H to the control pod P for operating the various valves and functions associated with the system.

In a marine environment, the flexible hydraulic hose bundle H is subject to frequent flexing due to marine forces such as currents. The hose-to-wireline connectors 100 of the present invention are used to secure and protect the hose bundle H against such undesired stresses. The connector devices 100 of the present invention freely mount with the wireline W which extends between the wireline reel on the floating vessel and the subsea template T.

The connector device 100 of the present invention is particularly adapted to freely secure a hydraulic hose bundle H to a wireline W extending between the offshore platform or floating vessel and the subsea template T.

Referring now to FIG. 2, a generally cylindrical clamping body 20 is formed having an axial passage through the clamping body 20 for receiving a hydraulic hose bundle H therethrough. The clamping body 20 is further formed having first and second generally semi-cylindrical body members 22 and 24, respectively. The first body member 22 has a semi-cylindrical interior wall portion 22$i$ and the second body member 24 similarly has a semi-cylindrical interior wall portion 24$i$. Pivotal mount means 26 operably connects the first and second body members 22 and 24 and mounts the first and second body members 22 and 24 for pivotal movement between an open position, in which the hydraulic hose bundle H can be placed within the clamping body 20, and a closed position, in which the hydraulic hose bundle H is secured within the axial passage of the clamping body 20 of the connector device 100.

A bundle clamping means 28 is mounted with the first and second body members 22 and 24 for securing the first and second body members 22 and 24 in the closed position about the hydraulic hose bundle H. Preferably, in the closed position of the clamping body 20 with the hose bundle H therebetween, the interior wall portions 22$i$ and 24$i$ of the first and second body members 22 and 24, respectively, are in secure engagement with the hydraulic hose bundle H through a deformable sleeve 32 as shown in FIG. 2.

Referring to FIGS. 2 and 6, the deformable sleeve 32 is mounted within the interior walls 22$i$ and 24$i$ of the first and second body members 22 and 24, respectively, for resiliently engaging the hydraulic hose bundle H. Since the diameter of the hydraulic hose bundles H varies with respect to the desired number of hoses, the deformable sleeve 32 can be provided in varying sizes and thicknesses in order to adapt the clamping body 20 to engage different diameters of the hydraulic hose bundles H.

Referring particularly now to FIG. 6 which shows a preferred embodiment of the deformable sleeve 32 in greater detail, the deformable sleeve 32 comprises an outer layer 32$o$, an inner layer 32$i$, and a middle layer 32$m$ disposed between the outer layer 32$o$ and the inner layer 32$i$. Generally, the outer layer 32$o$ and the inner layer 32$i$ are composed of a deformable material of a hard rubber such as Buna-N or plastic. Preferably, the middle layer 32$m$ is a semi-cylindrical metallic plate. Referring to FIG. 2, the deformable sleeve 32 includes two semi-cylindrical sleeve sections 32$a$ and 32$b$ mounted, respectively, with interior wall portions 22$i$ and 24$i$ of the first and second body members 22 and 24, respectively. When the first and second body members 22 and 24, respectively, are in the closed position, an interior wall portion 32$h$ of the deformable sleeve 32 engages the outer sheath 19 of the hydraulic hose bundle H, and the longitudinal edges of the deformable sleeve section 32$a$ mounted with first body member 22 and the deformable sleeve section 32$b$ mounted with second body member 24 are in contact or a relatively small distance apart.

In the preferred embodiment, the deformable sleeve 32 is mounted with the first and second body members 22 and 24 with a bolt or other suitable means inserted through countersunk holes 32$t$ (FIG. 6) in the deformable sleeve 32 into the body members 22 and 24.

Referring to FIGS. 2 and 5, the pivotal mount means 26 forms a hinge which includes a pivot pin 26$a$ which passes through axial openings formed in alternately spaced, aligned pivot fingers 26$b$ with the second body member 24 and pivot finger 26$c$ formed with the first body member 22.

Referring to FIG. 2, the bundle clamping means 28 includes a first yoke 38 extending from the first body member 22 and a second yoke 40 extending from the second body member 24. The first and second yokes 38 and 40, respectively, are formed substantially diagonally opposite the pivotal mount means 26.

A yoke connector means 42 releasably connects the first and second yokes 38 and 40, respectively, together when the body members 22 and 24 are in the closed position with the hydraulic hose bundle H securely positioned in the axial passage therebetween.

The first yoke 38 includes a first finger 38$a$ and a spaced-apart second finger 38$b$ extending laterally from the first body member 22. The second yoke 40 includes a first finger 40$a$ and a spaced-apart second finger 40$b$ extending laterally from the second body member 24. The yoke connector means 42 includes a threaded swing bolt 42$b$ having a head portion 42$h$. A bolt head pivotal mount means 43 includes a pin 43$a$ extending through the fingers 40$a$ and 40$b$ for pivotally mounting the swing bolt 42$b$. The fingers 38$a$ and 40$a$ and 38$b$ and 40$b$ are aligned to allow the swing bolt 42$b$ to pivot to a closed position in which the threaded portion of the swing bolt 42$b$ is positioned between the spaced fingers 38$a$ and 38$b$.

Referring to FIG. 2, a threaded nut 42$n$ is threaded onto the swing bolt 42$b$ and is rotated into engagement with the fingers 38$a$ and 38$b$ to secure the closing of the body members 22 and 24. The nut 42$n$ is shown in FIG. 2 as a wing nut although it is to be understood that the nut 42$n$ is not limited to wing nuts. In FIGS. 3 and 4, the nut 42$n$ is shown as a hexagonal nut instead of a wing nut. Although not shown, it is desirable to have a outer bearing surface on the first yoke 38 which is substantially tangential to the bearing face of the nut 42$n$ as it tightens against the first yoke.

As shown in FIG. 2, a closure means 47 is mounted with the second body member 24. The closure means 47 is independent of the bundle clamping means 28 and extends laterally from the second body member 24. It is to be understood that the closure means 47 could alternatively be mounted with the first body member 24.

The closure means 47 releasably and freely attaches the cylindrical clamping body 20 to the wireline W, which extends between the well platform and the subsea template T.

The closure means 47 of the hose-to-wireline connector 100 includes a first closure yoke 44 extending laterally from the second body member 24. The first closure yoke 44 includes spaced-apart fingers 44a and 44b. A second closure yoke 46 extends laterally from the second body member 24 and includes spaced-apart fingers 46a and 46b. The fingers 44a and 44b are spaced from the fingers 46a and 46b, respectively, forming a passageway 60 between the first and second closure yokes 44 and 46, respectively, as shown in FIGS. 2 and 3. Referring to FIGS. 2–5, each of the fingers 44a, 44b, 46a and 46b has an inner roller cutout portion 48 for receiving a rotatably mounted roller 49. The roller cutout portions 48 are preferably correspondingly aligned in the fingers 44a and 44b of the first closure yoke 44 and in the fingers 46a and 46b of the second closure yoke 46 as shown in FIGS. 2–5. The rollers 49 are cylindrical and are preferably made of stainless steel. Preferably, the rollers 49 are rotatably mounted with drive pins 49a. The cylindrical rollers 49 are mounted in the roller cutout portions 48 such that the peripheral surface of the rollers 49 extends beyond the inner face of the fingers 44a, 44b, 46a, and 46b in the passageway 60.

The closure means 47 further comprises a pivotal mount closure means 50. The pivotal mount closure means 50 releasably connects the first and second closure yokes 44 and 46 with the wireline W positioned in the passageway 60 between the first and second closure yokes 44 and 46.

The pivotal mount closure means 50 comprises a gate member 50g pivotally mounted to the first closure yoke 44 by a pin 50p extending through aligned bores in the fingers 44a and 44b and the gate member 50g. The gate member 50g is disposed between the fingers 44a and 44b. In this manner, the gate member 50g is movable to an open position (FIG. 3) in which the wireline W can be placed into or removed from the passageway 60 and a closed position (FIGS. 2, 4 and 5) in which the wireline W is freely secured in the passageway 60 between the first and second closure yokes 44 and 46.

Preferably, the gate member 50g includes an inner roller recess portion 52 for receiving a rotatably mounted roller 51a as shown in FIGS. 3–5.

Referring to FIGS. 2, 4 and 5, a roller mounting plate 53 and a mounting and retainer plate 54 extend between the fingers 44a and 44b of the first closure yoke 44 and between the fingers 46a and 46b of the second closure yoke 46, respectively. A roller 51b is rotatably mounted between the roller mounting plate 53 and the mounting and retainer plate 54.

The rollers 51a and 51b are mounted transversely to the rollers 49 and have a longitudinal axis in a plane parallel to the planes of the longitudinal axis of each of the rollers 49.

As shown in FIGS. 4 and 5, the rollers 51a and 51b are oppositely positioned in the passageway 60 when the gate member 50g is in the closed position. Typically, the wireline W has a diameter of approximately ¾" to 1" and the clear distance between the oppositely positioned rollers 51a and 51b is slightly greater than the wireline diameter. Similarly, the clear distance between opposing rollers 49 is slightly greater than the wireline diameter. This spacing between the rollers allows the wireline W to freely travel through the closure means 47 or alternatively, allows the connector device 100 to freely travel along the length of the wireline W. Any contact between the closure means 47 and the wireline W as the connector device 100 moves relative to the wireline W results in one or more of the rollers 49, 51a and 51b rotating and providing free relative movement.

As shown in FIG. 4, the wireline W is centrally maintained in the passageway 60 between the rollers 49, 51a and 51b when the connector device 100 is freely attached to the wireline W. This enables the connector device 100 to freely ascend and descend along the wireline W.

Referring to FIGS. 3 and 4, a fastening means 55 is provided to secure the gate member 50g in the closed position. The fastening means 55 includes a threaded bolt 55b having an elongated hexagonal head 55h. The threaded bolt 55b extends through a bore in the gate member 50g. The threaded bolt 55b is adapted to threadedly engage a threaded bore 54b in the mounting and retainer plate 54 as shown in dashed lines in FIG. 4. The first and second closure yokes 44 and 46 are secured together by the gate member 50g when the bolt 55b is threadedly engaged with the bore 54b in the mounting and retainer plate 54.

In the preferred embodiment of the present invention, the connector device 100 is made of durable materials suitable for corrosive environments such as seawater. Preferably, the components of the connector device 100 are made out of stainless steel or other comparable material.

Operation of the Present Invention

In the operation of the hose-to-wireline connector 100 of the present invention, the connector device 100 is freely attached to the wireline W. With the gate member 50g pivoted in the open position as shown in FIG. 3, the wireline W is placed in the passageway 60 formed by the aligned fingers 44a, 44b, 46a and 46b of the first and second closure yokes 44 and 46, respectively. The gate member 50g is then pivoted to the closed position and the threaded bolt 55b is threadedly engaged with the threaded bore 54b of the mounting and retainer plate 54. The rotatably-mounted rollers 49, 51a, and 51b surrounding the enclosed wireline W provides a substantially frictionless means for allowing relative movement along the wireline W. Additionally, the rollers 49, 51a, and 51b minimize wear to the wireline and to the connector device 100.

The hydraulic hose bundle H is secured in the clamping body 20 after first installing the desired thickness of the deformable sleeve 32. The clamping body 20 is pivoted in the open position and the hydraulic hose bundle H is positioned in the axial passage. The first and second body members 22 and 24 are then pivoted to the closed position and the swing bolt 42b is pivoted into the closed position. The nut 42n is screwed further onto the swing bolt 42b until contact with the fingers 38a and 38b of the first yoke 38. The threading of the nut 42n is continued until the desired compression of the hydraulic hose bundle H between the first and second body members 22 and 24, respectively, is achieved.

The present invention freely secures the hydraulic hose bundle H to the wireline W. A single size of clamping body 20 can be maintained by the user with a selection of various thicknesses of deformable sleeves 32 to adapt the connector device 100 to secure varying diameters of hose bundles H.

The interior layer 32i of the deformable sleeve 32 markedly reduces chafing and degradation of the outer sheath 19 of the hydraulic hose bundle H by elimination of any metal to plastic contact. The plastic to plastic contact between the inner layer 32i of deformable sleeve 32 and the outer sheath 19 of the hydraulic hose bundle H additionally increases the frictional engagement of the connector device 100 to the hydraulic hose bundle H.

The foregoing disclosure and description of the invention are illustrative and explanatory thereof, and various changes in the size, shape and materials, as well as in the details of the illustrated construction may be made without departing from the spirit of the invention.

What is claimed is:

1. A connector device adapted to freely secure a hydraulic hose bundle to a guide wire extending between a subsea structure at the sea floor and the water surface, the connector device comprising:

a generally cylindrical clamping body having an axial passage through said clamping body for grippingly receiving the hydraulic hose bundle;

a closure means mounted with said clamping body for freely securing said clamping body to the guide wire, said closure means comprising:

a first yoke extending laterally from said clamping body;

a second yoke extending laterally from said clamping body;

a gate member pivotally mounted to one of said yokes; and means for releasably securing said gate member to the other of said yokes, wherein a passageway is formed between said clamping body, said gate member, and said first and second yokes, and the guide wire is allowed to freely travel through the passageway; and a plurality of rollers mounted to said closure means, wherein one or more said rollers are adapted to freely rotate when contacted by the guide wire during relative movement between the connector device and the guide wire.

2. The connector device of claim 1, further comprising a deformable sleeve mounted with said clamping body for resiliently engaging the hose bundle.

3. The connector device of claim 1, wherein said plurality of rollers substantially surround the guide wire.

4. The connector device of claim 3, wherein said plurality of rollers comprises a first pair of rollers and a second pair of rollers, said first pair of rollers oriented ninety degrees relative to said second pair of rollers.

5. The connector device of claim 1, wherein each of said first and second yokes has a roller cutout portion and one of said plurality of rollers rotatably mounted therein.

6. The connector device of claim 5, wherein said gate member has an inner roller recess portion and one of said plurality of rollers rotatably mounted therein.

7. The connector device of claim 1, wherein each of said first and second yokes has two roller cutout portions and one of said plurality of rollers rotatably mounted within each said roller cutout portion.

8. The connector device of claim 7, wherein said gate member has an inner roller recess portion and one of said plurality of rollers rotatably mounted therein.

* * * * *